US012181819B2

(12) United States Patent
Hara et al.

(10) Patent No.: US 12,181,819 B2
(45) Date of Patent: Dec. 31, 2024

(54) FIXING APPARATUS AND IMAGE FORMING APPARATUS

(71) Applicant: CANON KABUSHIKI KAISHA, Tokyo (JP)

(72) Inventors: Jun Hara, Kanagawa (JP); Satoshi Nishida, Kanagawa (JP); Takanori Mitani, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 51 days.

(21) Appl. No.: 18/176,687

(22) Filed: Mar. 1, 2023

(65) Prior Publication Data

US 2023/0205120 A1 Jun. 29, 2023

Related U.S. Application Data

(62) Division of application No. 17/406,247, filed on Aug. 19, 2021, now Pat. No. 11,635,714.

(30) Foreign Application Priority Data

Aug. 27, 2020 (JP) ................................ 2020-143874
Aug. 27, 2020 (JP) ................................ 2020-143875
Jun. 28, 2021 (JP) ................................ 2021-106746

(51) Int. Cl.
*G03G 15/20* (2006.01)

(52) U.S. Cl.
CPC ..... *G03G 15/2053* (2013.01); *G03G 15/2064* (2013.01); *G03G 2215/2038* (2013.01)

(58) Field of Classification Search
CPC .......... G03G 15/2017; G03G 15/2053; G03G 15/2064; G03G 2215/2003
See application file for complete search history.

(56) References Cited

U.S. PATENT DOCUMENTS 9,488,940 B2 11/2016 Maruyama
9,766,580 B2 9/2017 Hashimoto
(Continued)

FOREIGN PATENT DOCUMENTS

JP 2003228246 A 8/2003
JP 2008170882 A 7/2008
(Continued)

OTHER PUBLICATIONS

Office Action issued in U.S. Appl. No. 17/406,247 mailed Jul. 13, 2022.
(Continued)

*Primary Examiner* — Thomas S Giampaolo, II
(74) *Attorney, Agent, or Firm* — ROSSI, KIMMS & McDOWELL LLP

(57) ABSTRACT

A fixing apparatus includes a first rotary member, a heating element, a second rotary member, a nip member, a reflection member, and a support member. The support member configured to transit to a pressurized state and a non-pressurized state, the pressurized state being a state in which a first position and a second position of the support member are pressurized in a pressurization direction toward the second rotary member, the non-pressurized state being in which the pressurized state of the support member is released. The support member includes a contact surface in contact with the reflection member in the pressurized state. The contact surface takes such a posture that a center position between the first and second positions in the rotation axial direction is close to the second rotary member rather than the first and second positions in a case where the support member is in the non-pressurized state.

7 Claims, 12 Drawing Sheets

(56) References Cited

U.S. PATENT DOCUMENTS

| | | | | |
|---|---|---|---|---|
| 9,829,842 | B2 | 11/2017 | Kajita | |
| 9,977,381 | B2 | 5/2018 | Yasui | |
| 10,168,653 | B2 | 1/2019 | Matsuda | |
| 2003/0156866 | A1 | 8/2003 | Shida et al. | |
| 2011/0170920 | A1 | 7/2011 | Fujiwara | |
| 2014/0086649 | A1* | 3/2014 | Hazeyama | G03G 15/2053 399/329 |
| 2014/0161500 | A1* | 6/2014 | Kataoka | G03G 15/2053 399/331 |
| 2014/0294464 | A1 | 10/2014 | Maruyama et al. | |
| 2014/0294465 | A1 | 10/2014 | Hazeyama et al. | |
| 2017/0176906 | A1* | 6/2017 | Sawada | G03G 15/2053 |
| 2017/0269521 | A1* | 9/2017 | Takeda | G03G 15/2053 |

FOREIGN PATENT DOCUMENTS

| | | | |
|---|---|---|---|
| JP | 2011137933 | A | 7/2011 |
| JP | 2011170102 | A | 9/2011 |
| JP | 2013195947 | A | 9/2013 |
| JP | 2014056149 | A | 3/2014 |
| JP | 2014066851 | A | 4/2014 |
| JP | 2014199307 | A | 10/2014 |
| JP | 2014199309 | A | 10/2014 |
| JP | 2017067900 | A | 4/2017 |
| JP | 2017068057 | A | 4/2017 |
| JP | 2017116572 | A | 6/2017 |
| JP | 2017134152 | A | 8/2017 |
| JP | 2018041065 | A | 3/2018 |
| JP | 2018180044 | A | 11/2018 |
| JP | 2019035937 | A | 3/2019 |
| JP | 2020118785 | A | 8/2020 |

OTHER PUBLICATIONS

2 Notice of Allowance issued in U.S. Appl. No. 17/406,247 mailed Dec. 20, 2022.

* cited by examiner

FIXING APPARATUS AND IMAGE FORMING APPARATUS

BACKGROUND OF THE INVENTION

Field of the Invention

The present invention relates to a fixing apparatus configured to fix a toner image onto a sheet and to an image forming apparatus including the fixing apparatus.

Description of the Related Art

In general, an electro-photographic laser printer includes a fixing apparatus configured to fix a toner image onto a sheet by applying heat and pressure to the toner image transferred onto the sheet. Hitherto, Japanese Patent Application Laid-open No. 2014-66851 discloses a fixing apparatus including a cylindrical fixing belt, a heating unit configured to heat the fixing belt and a pressure roller forming a nip portion together with the fixing belt.

The heating unit includes a halogen ramp generating radiant heat, a nip member receiving the radiant heat from the halogen ramp, a reflecting plate reflecting the radiant heat from the halogen ramp to the nip member and a stay supporting the nip member. The reflecting plate is positioned by being sandwiched between the highly stiff stay and the nip member.

However, if the stay deflects, the reflecting plate also deflects following the stay in the fixing apparatus described Japanese Patent Application Laid-open No. 2014-66851. Specifically, the stay often defects by receiving a load in a pressurized state in which the nip portion is pressurized. If the stay and the reflecting plate thus deflect, uneven heat is likely to be generated in the nip portion, possibly causing image defects such as uneven glossiness.

SUMMARY OF THE INVENTION

According to a first aspect of the present invention, a fixing apparatus includes a first rotary member which is formed to be endless, a heating element disposed inside of the first rotary member, a second rotary member in contact with an outer circumferential surface of the first rotary member and forming a nip portion which fixes a toner image onto a sheet together with the first rotary member, a nip member provided slidably with an inner circumferential surface of the first rotary member so as to nip the first rotary member together with the second rotary member and configured to heat the nip portion by receiving radiant heat from the heating element, a reflection member reflecting the radiant heat from the heating element toward the nip member, and a support member supporting the nip member through the reflection member. The support member configured to transit to a pressurized state and a non-pressurized state, the pressurized state being a state in which a first position and a second position different from the first position in a rotation axial direction of the support member are pressurized in a pressurization direction toward the second rotary member, the non-pressurized state being in which the pressurized state of the support member is released. The support member includes a contact surface in contact with the reflection member in the pressurized state. The contact surface takes such a posture that a center position between the first and second positions in the rotation axial direction is close to the second rotary member rather than the first and second positions in a case where the support member is in the non-pressurized state.

According to a second aspect of the present invention, a fixing apparatus includes a first rotary member which is formed to be endless, a heating element disposed inside of the first rotary member, a second rotary member in contact with an outer circumferential surface of the first rotary member and forming a nip portion which fixes a toner image onto a sheet together with the first rotary member, a nip member provided slidably with an inner circumferential surface of the first rotary member so as to nip the first rotary member together with the second rotary member and configured to heat the nip portion by receiving radiant heat from the heating element, a reflection member reflecting the radiant heat from the heating element toward the nip member, and a support member supporting the nip member through the reflection member. The support member configured to transit to a pressurized state and a non-pressurized state, the pressurized state being a state in which a first position and a second position different from the first position in a rotation axial direction of the support member are pressurized in a pressurization direction toward the second rotary member, the non-pressurized state being in which the pressurized state of the support member is released. An outer diameter of a center portion, in the rotation axial direction, of the second rotary member is smaller than each of outer diameters of end portions, in the rotation axial direction, of the second rotary member.

According to a third aspect of the present invention, a fixing apparatus includes a first rotary member which is formed to be endless, a heating element disposed inside of the first rotary member, a second rotary member in contact with an outer circumferential surface of the first rotary member and forming a nip portion which fixes a toner image onto a sheet together with the first rotary member, a nip member provided slidably with an inner circumferential surface of the first rotary member so as to nip the first rotary member together with the second rotary member and configured to heat the nip portion by receiving radiant heat from the heating element, a support member supporting the nip member, and an elastic portion having elastic modulus lower than that of the support member and the nip member, the elastic portion being disposed between the support member and the nip member in a pressurization direction orthogonal to a rotation axial direction of the second rotary member and to a sheet conveyance direction.

Further features of the present invention will become apparent from the following description of exemplary embodiments with reference to the attached drawings.

DESCRIPTION OF THE EMBODIMENTS

First Exemplary Embodiment

Entire Configuration

Figure 1A:
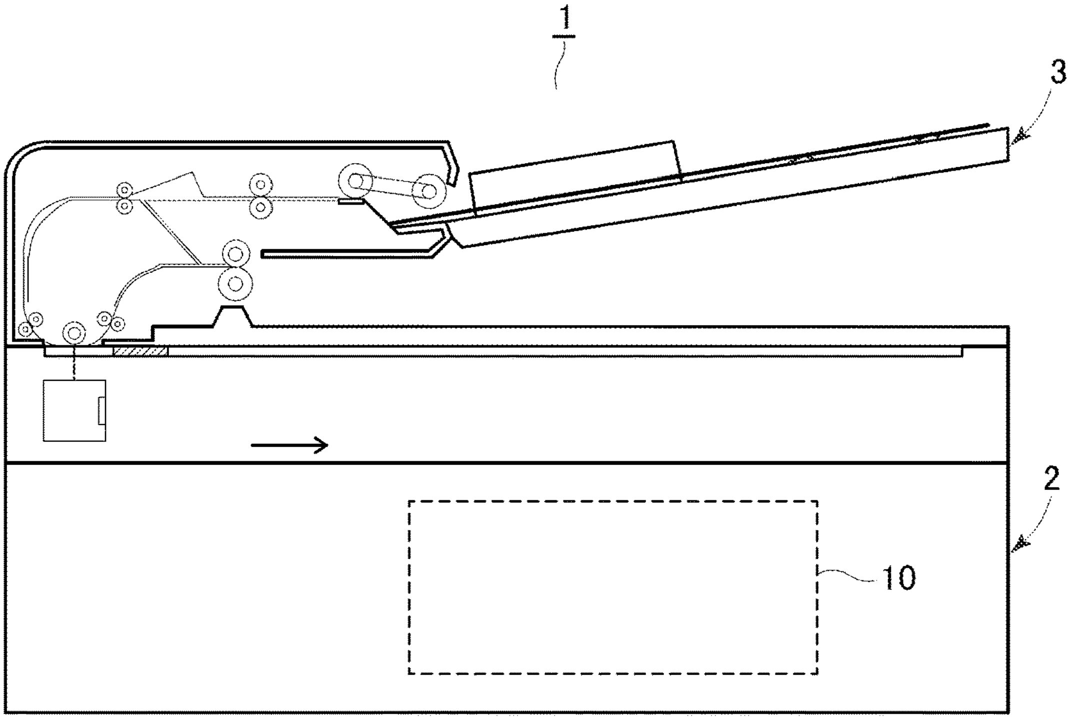
FIG. 1A is a schematic diagram illustrating an entire configuration of a printer of a first exemplary embodiment.

Exemplary embodiments of the present disclosure will be described below with reference to the drawings. FIG. 1A is a schematic diagram illustrating a printer 1 serving as an image forming apparatus of a first exemplary embodiment. As illustrated in FIG. 1A, the printer 1 includes an apparatus body 2, an image reading apparatus 3 provided above the apparatus body 2 and an image forming unit 10 provided within the apparatus body 2 and configured to form an image onto a sheet.

Figure 1B:
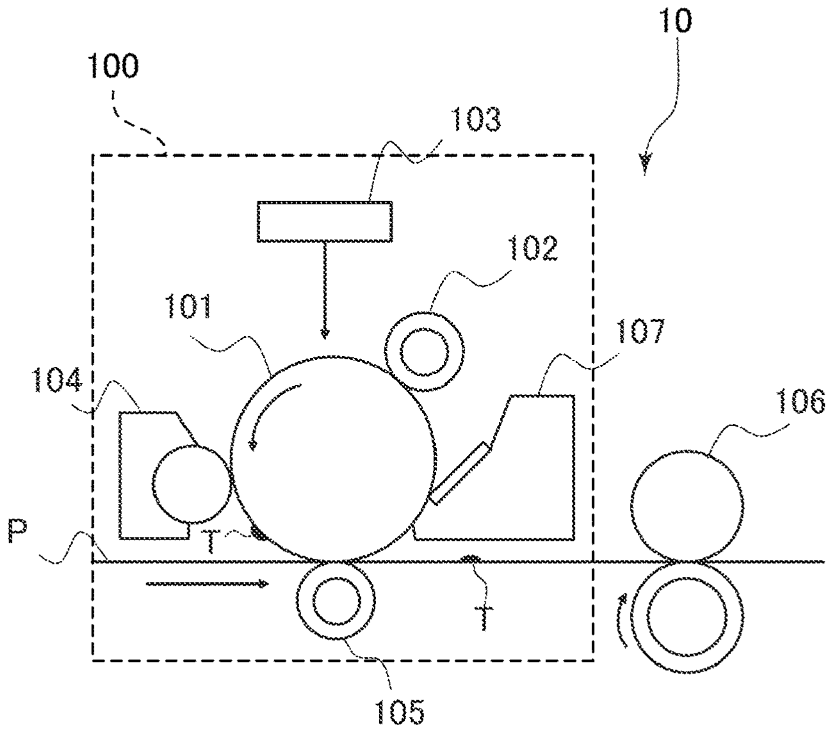
FIG. 1B is a schematic diagram illustrating an image forming unit of the first exemplary embodiment.

As illustrated in FIG. 1B, the image forming unit 10 includes an electro-photographic image forming portion 100 and a fixing apparatus 106. When the image forming portion 100 is instructed to start an image forming operation, a photosensitive drum 101 serving as a photosensitive member is rotated and a surface thereof is homogeneously charged by a charging roller 102. Then, an exposing unit 103 outputs a laser beam modulated based on image data transmitted from the image reading apparatus 3 or an outside computer to scan the surface of the photosensitive drum 101 to form an electrostatic latent image. This electrostatic latent image is visualized or developed and is turned out to be a toner image T by toner supplied from a developing unit 104.

In parallel with such image forming operation, a sheet feeding operation of feeding a sheet P stacked on a cassette or a manual feed tray not illustrated toward the image forming unit 10 is executed. The sheet P thus fed is conveyed to the image forming unit 10 in synchronism with an advance of the image forming operation of the image forming portion 100.

Then, the toner image T borne on the photosensitive drum 101 is transferred onto the sheet P by a transfer roller 105. Toner left on the photosensitive drum 101 after the transfer of the toner image is collected by a cleaning unit 107. The sheet P onto which the non-fixed toner image has been transferred is delivered to a fixing apparatus 106. The fixing apparatus 106 melts the toner by applying heat and pressure and fixes the toner image T onto the sheet P The sheet P onto which the toner image T has been fixed is discharged out of the apparatus by a discharge roller pair and others.

Fixing Apparatus

Figure 2:
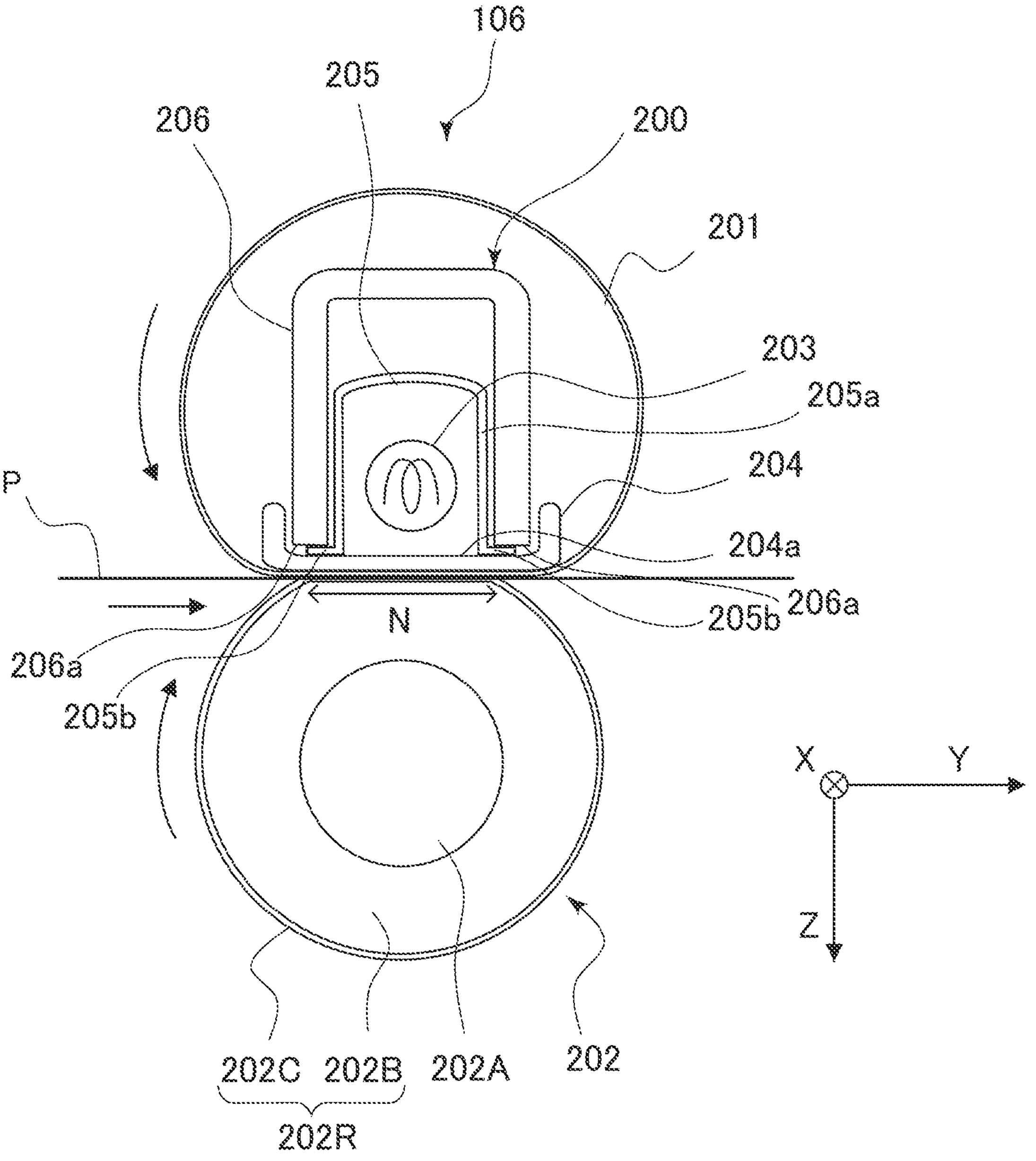
FIG. 2 is a section view illustrating a fixing apparatus of the first exemplary embodiment.

Next, the fixing apparatus 106 of the present exemplary embodiment will be described with reference to FIG. 2. As illustrated in FIG. 2, the fixing apparatus 106 includes an endless fixing belt 201, a heating unit 200 for heating the fixing belt 201 and a pressurizing roller 202 for sandwiching the fixing belt 201 with the heating unit 200. Note that the fixing belt 201 includes a thin film-like member.

The fixing belt 201 serving as a first rotary member is made of a highly heat conductive and low thermal capacity polyimide resin and is a flexible endless belt. Note that the fixing belt 201 may be formed from other resin or of metal such as stainless steel.

The fixing belt 201 is provided to be rotatable and lubricant is applied on an inner circumferential surface of the fixing belt 201 to assure slidability with a nip member 204 described later. Then, guide members not illustrated are provided on both end portions in a rotation axial direction (referred to as an "axial direction K" hereinafter) of the fixing belt 201 to guide the rotation of the fixing belt 201 and to restrict the fixing belt 201 from moving in the rotation axial direction.

The heating unit 200 is disposed on an inner circumferential side of the fixing belt 201 and includes a halogen lump 203, the nip member 204, a reflecting plate 205 and a support member 206. The halogen lump 203 serving as a heating element is disposed with a space from the fixing belt 201 and the nip member 204 so as to emit radiant heat and to heat the fixing belt 201. Temperature of the radiant heat of the halogen lump 203 changes depending on a supply amount supplied from a power source not illustrated. In a case of the present exemplary embodiment, the temperature of the radiant heat emitted by the halogen lump 203 is adjusted in accordance to control of the supply amount made by a control portion not illustrated such that temperature of a nip portion N detected by a temperature sensor not illustrated is kept at a predetermined temperature. Note that the heating element is not limited to the halogen ramp and may be another heating element.

The nip member 204 is a lengthy member provided to be non-rotational with respect to the rotary fixing belt 201 and extending in the axial direction X slidably with the inner circumference of the fixing belt 201. While the halogen lump 203 emits the radiant heat to heat the fixing belt 201, and the nip member 204 receives the radiant heat from the halogen lump 203 at that time as described above. That is, the nip member 204 includes a heat receiving surface 204*a* facing to the halogen lump 203 to receive the radiant heat from the halogen lump 203.

The reflecting plate 205 serving as a reflection member reflects the radiant heat emitted from the halogen lump 203 toward the nip member 204 and is disposed with a predetermined distance from the halogen lump 203 so as to cover the halogen lump 203. Due to that, the reflecting plate 205 is formed of an aluminum plate for example having large reflectivity of infrared rays and far infrared rays by curving such that a sectional face thereof is formed into an approximately U-shape. The nip portion N can be heated up quickly through the nip member 204 by efficiently utilizing the radiant heat from the halogen lump 203 because the radiant heat from the halogen lump 203 can be collected to the nip member 204 by the reflecting plate 205.

More specifically, the reflecting plate 205 includes a reflecting portion 205*a* having an inner surface that receives the radiant heat and flange portions 205*b* that extend in a sheet conveyance direction Y and in an opposite direction from the sheet conveyance direction Y from both end portions of the reflecting portion 205*a*. The reflecting plate 205 is formed by press-molding the aluminum plate of 400 μm thick onto which mirror finish having high reflectivity is applied. The reflecting plate 205 is desirable to be thin within a range of being able of hold its shape. It is because a rate of heat from the halogen lump 203 consumed to temperature rise of the reflecting plate 205 increases and heating efficiency of the nip member 204 drops if thermal capacity of the reflecting plate 205 is large.

The support member 206 is a structure having a predetermined stiffness to support the nip member 204 and is formed into a shape running along an outer surface of the reflecting plate 205 by using metal excellent in strength such as stainless steel and spring steel. More specifically, the support member 206 supports the both end portions of the nip member 204 through flange portions 205*b* of the reflecting plate 205 in the sheet conveyance direction Y which is a short hand direction of the nip member 204 and in a pressurization direction Z direction.

Because the flange portion 205*b* of the reflecting plate 205 is sandwiched in the pressurization direction Z by the support member 206 and the nip member 204, it is possible to suppress the reflecting plate 205 from being displaced in the pressurization direction Z. Still further, because the highly stiff support member 206 supports the flange portion 205*b* of the reflecting plate 205, the shape of the reflecting plate 205 in the axial direction X can be held favorably across an entire length thereof. A gap is also provided between the reflecting portion 205*a* and the support member 206 to reduce heat of the nip member 204 from escaping to the support member 206.

In a case of the present exemplary embodiment, the support member 206 pressurizes the nip member 204 in the pressurization direction Z and the fixing belt 201 is pressed from inside toward the pressurizing roller 202 by the pressurized nip member 204 to be able to form the nip portion N more reliably.

The pressurizing roller 202 is configured to abut with an outer circumferential surface of the fixing belt 201 and to be rotatably supported. In the present exemplary embodiment, the pressurizing roller 202 is rotated with a predetermined peripheral velocity in a direction of an arrow in FIG. 2 by a driving motor not illustrated. Then, due to a frictional force generated at the nip portion N, a rotation force of the pressurizing roller 202 is transmitted to the fixing belt 201. Thus, the fixing belt 201 is driven by the pressurizing roller 202. That is, a so-called pressure roller driving system is adopted in the present exemplary embodiment. The pressurizing roller 202 is constructed by forming an elastic layer 202B around a metallic core metal 202A serving as a rotation shaft and by forming a releasing layer 202C formed of fluorine resin such as P E, PFA and FEP around the elastic layer 202B. The elastic layer 202B contains voids therein. The elastic layer 202B and the releasing layer 202C compose a roller portion 202R serving as a second rotary member.

The core metal 202A is rotatably supported by bearing portions not illustrated that support both end portions in the axial direction X of the core metal 202A. Then, the support member 206 pressurizes the nip member 204 in the pressurization direction Z by a load from a pressurizing member not illustrated to press the fixing belt 201 toward the pressurizing roller 202. Thereby, a surface of the pressurizing roller 202 elastically deforms and the nip portion N having a predetermined width in terms of the sheet conveyance direction Y is formed by the surface of the pressurizing roller 202 and the surface of the fixing belt 201. In the present exemplary embodiment, a load W1 applied at the both end portions in the axial direction X of the support member 206 is set to be 9 kg each and a load of 18 kg in total is exerted on the support member 206.

It is noted that the pressurization direction Z is a direction orthogonal to the axial direction X and the sheet conveyance direction Y Still further, the nip member 204 is not limited to be what comes into direct contact with the fixing belt 201 and may be what comes into contact with the fixing belt 201 through a sheet member having high thermal conductivity such as iron alloy and aluminum.

Figure 3A:
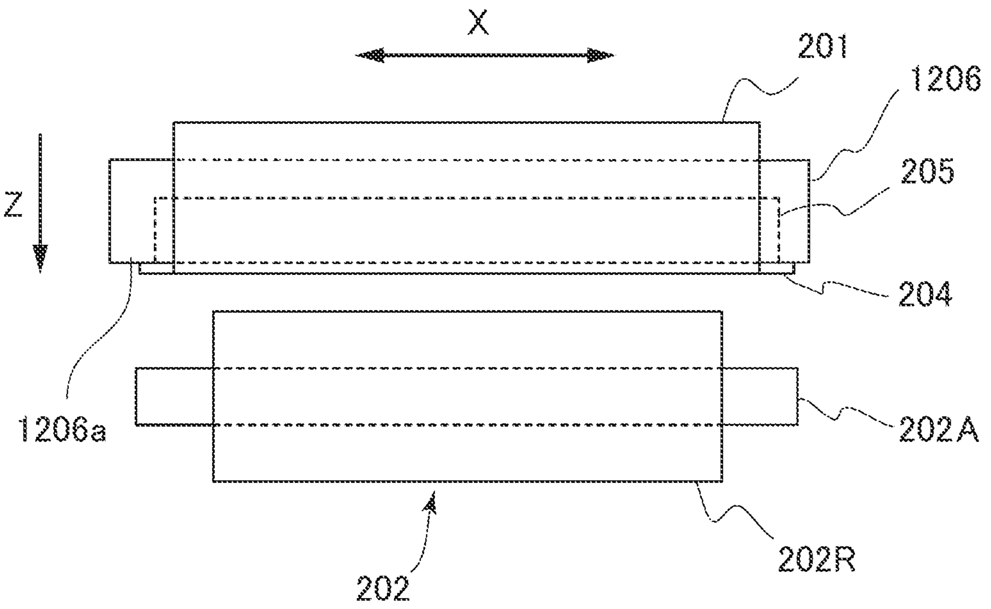
FIG. 3A is a schematic diagram illustrating the fixing apparatus in a non-pressurized state of a comparative example seen from a sheet conveyance direction.
Figure 3B:
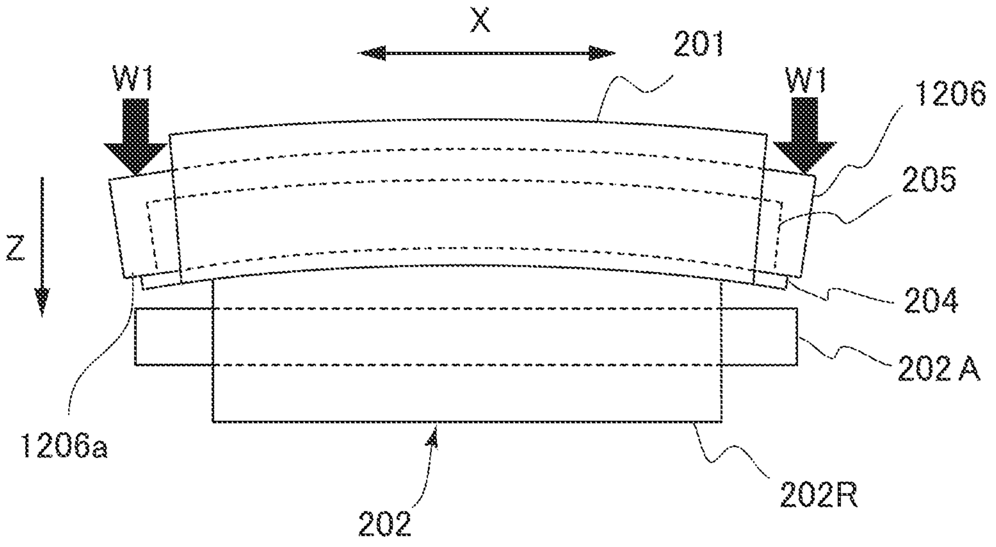
FIG. 3B is a schematic diagram illustrating the fixing apparatus in a pressurized state of the comparative example seen from the sheet conveyance direction.

Temperature of the nip member 204 rises by being heated up by the radiant heat from the halogen lump 203 and the radiant heat reflected by the reflecting plate 205 as described above. The sheet P on which a non-fixed toner image has been formed is heated and pressurized at the nip portion N by being nipped and conveyed by the rotating fixing belt 201 and the pressurizing roller 202, so that the toner image is fixed onto the sheet P Mechanism of Causing Uneven Heat Next, a mechanism of causing uneven heat will be described with a comparative example in FIGS. 3A through 4. FIG. 3A is a schematic diagram illustrating a fixing apparatus in a non-pressurized state of the comparative example seen from the sheet conveyance direction Y and FIG. 3B is a schematic diagram of the fixing apparatus in a pressurized state of the comparative example seen from the sheet conveyance direction Y. The pressurized state is a state in which a support member 1206 in the comparative example is pressurized in the pressurization direction Z toward the pressurizing roller 202 and the non-pressurized state is a state in which the pressurized state of the support member 1206 is released, i.e., a state in which no load W1 is applied to the support member 1206.

As illustrated in FIG. 3A, the support member 1206 has a contact surface 1206*a* in contact with the flange portion 205*b* of the reflecting plate 205. The contact surface 1206*a* extends in parallel with the axial direction X when the support member 1206 is in the non-pressurized state. When the support member 1206 is in the pressurized state, the load W1 is applied each of the both end portions in the axial direction X of the support member 1206 and a center portion of the support member 1206 deflects so as to separate from the pressurizing roller 202.

As the support member 1206 deflects, a center portion in the axial direction X of the reflecting plate 205 also deflects in a direction in which the center portion separates from the pressurizing roller 202 following the support member 1206.

As the reflecting plate 205 thus deflects, internal stress is generated and the reflecting plate 205 often ends up being locally wavily deformed.

Figure 4:
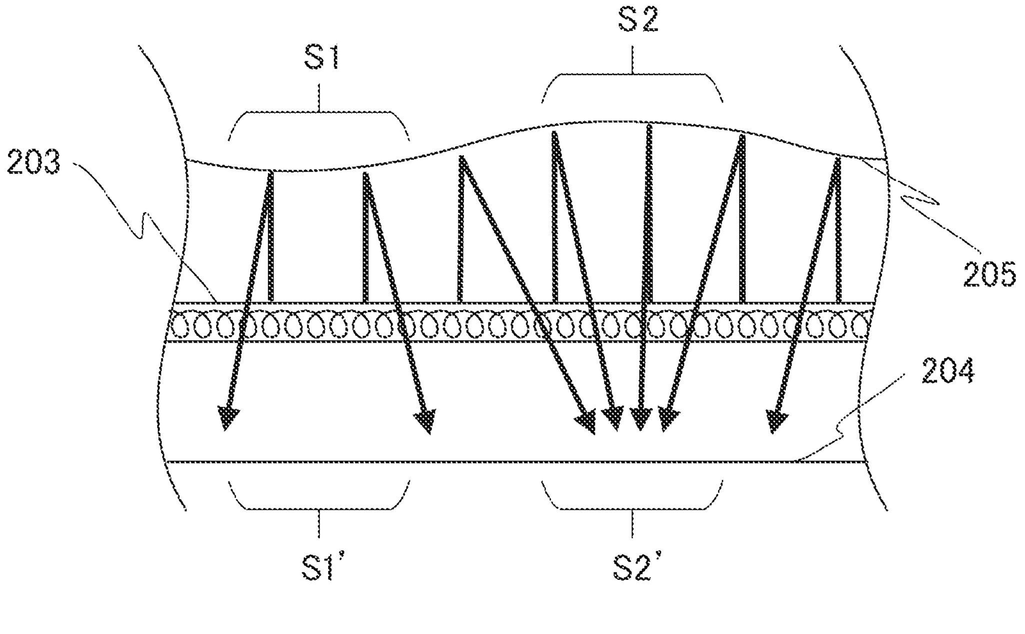
FIG. 4 is a schematic diagram illustrating the fixing apparatus seen from the sheet conveyance direction.

Unevenness of the radiant heat generated in a case where the reflecting plate 205 is locally wavily deformed will be described with reference to FIG. 4. FIG. 4 is a schematic diagram illustrating the fixing apparatus seen from the sheet conveyance direction Y. Arrows described in FIG. 4 indicate images of advance directions of the radiant heat emitted from the halogen lump 203 and reflected by the reflecting plate 205.

The reflecting plate 205 in a region S1 for example is convexly deformed so as to approach to the nip member 204 and the reflecting plate 205 in a region S2 is concavely deformed so as to separate from the nip member 204. Temperature at a region S1' of the nip member 204 close to the region S1 is hard to increase because density of the radiant heat reflected by the reflecting plate 205 is small. Meanwhile, temperature at a region S2' of the nip member 206 close to the region S2 likely to increase because density of the radiant heat reflected by the reflecting plate 205 is large.

The unevenness of temperature is thus generated in the nip member 204 in the fixing apparatus of the comparative example due to the deformation of the reflecting plate 205. Then, if the toner image T on the sheet P is heated up and is fixed in this state, gloss of the toner image T corresponding to the high temperature region within the nip portion N become high, thus generating unevenness of gloss.

Shape of Support Member

Figure 5A:
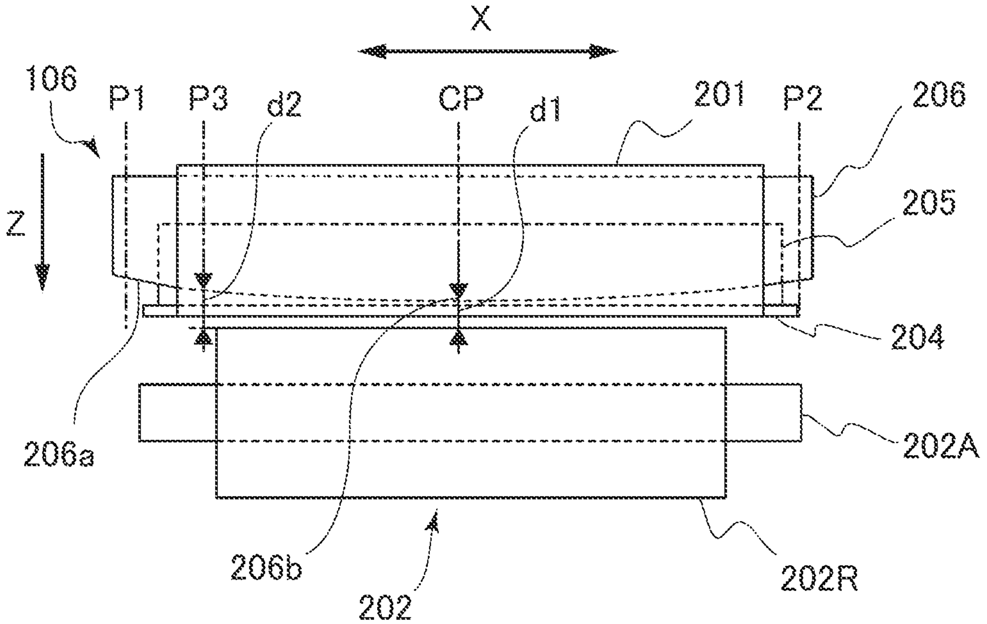
FIG. 5A is a schematic diagram illustrating the fixing apparatus in a non-pressurized state seen from the sheet conveyance direction.
Figure 5B:
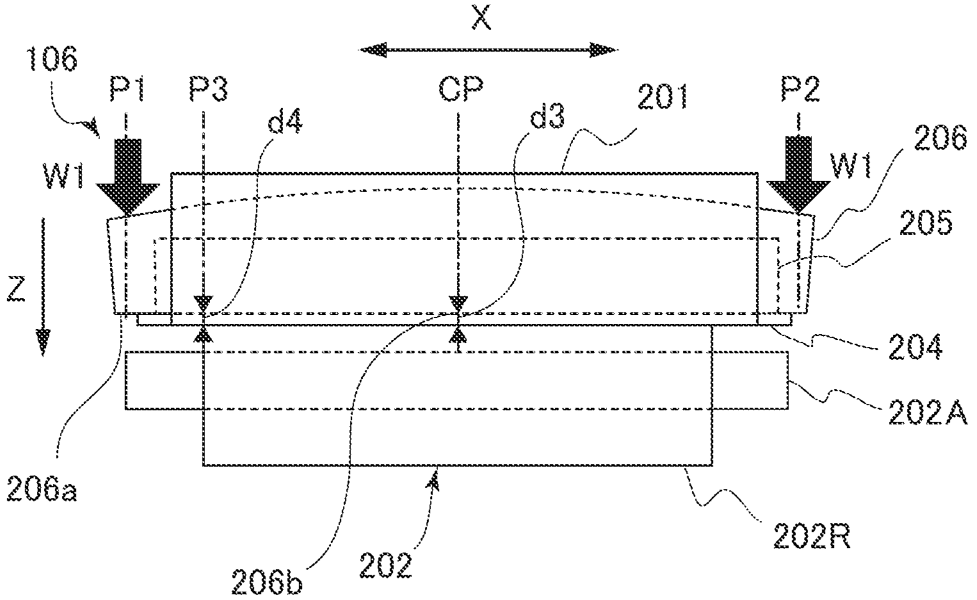
FIG. 5B is a schematic diagram illustrating the fixing apparatus in a pressurized state seen from the sheet conveyance direction.

The shape of the support member 206 of the present exemplary embodiment for suppressing the uneven heat and uneven gloss as described above will be described. FIG. 5A is a schematic diagram of the fixing apparatus 106 in a non-pressurized state seen from the sheet conveyance direction Y and FIG. 5B is a schematic diagram of the fixing apparatus 106 in a pressurized state seen from the sheet conveyance direction Y. The pressurized state is a state in which the support member 206 of the present exemplary embodiment is pressurized in the pressurization direction Z toward the pressurizing roller 202 and the non-pressurized state is a state in which the pressurized state of the support member 206 is released, i.e., a state in which no load W1 is applied to the support member 206. The support member 206 is configured to be able to transit between the pressurized state and the non-pressurized state.

As illustrated in FIGS. 2, 5A and 5B, the support member 206 includes the contact surface 206*a* in contact with the flange portion 205*b* of the reflecting plate 205 in the pressurized state. As illustrated in FIG. 5B, the support member 206 is pressurized in the pressurization direction Z toward the pressurizing roller 202 at a first position P1 and a second position P2 different from the first position P1 in the axial direction X in the pressurized state. The first position P1 and the second position P2 are in vicinities of both end portions in the axial direction X of the support member 206 and the load W1 is applied to each of these first and second positions P1 and P2.

As illustrated in FIG. 5A, no load W1 acts on each of the first and second positions P1 and P2 of the support member 206, so that the support member 206 is not deformed. At this time, a contact surface 206*a* of the support member 206 is curved toward the roller portion 202R of the pressurizing roller 202 such that a distance between the contact surface 206*a* and the roller portion 202R of the pressurizing roller 202 is shortened as it approaches the center portion 206*b* between the first and second positions P1 and P2. In other words, the contact surface 206*a* takes a posture that a center position CP corresponding to the center portion 206*b* is closer to the roller portion 202R rather than the first and second positions P1 and P2. That is, the contact surface 206*a* has a normal crown shape that bulges out to the roller portion 202R of the pressurizing roller 202.

Therefore, a distance between the contact surface 206*a* and an outer circumferential surface of the roller portion 202R is a distance d1 as a first distance at the center position CP between the first and second positions P1 and P2 in the axial direction X when the support member 206 is in the non-pressurized state. It is noted that the distance d1 corresponds to a distance between the center portion 206*b* of the contact surface 206*a* located at the center position CP and the outer circumferential surface of the roller portion 202R.

Still further, the distance between the contact surface 206*a* and the outer circumferential surface of the roller portion 202R is a distance d2 as a second distance which is longer than the distance d1 at a third position P3 between the first position P1 and the center position CP (d2>d1) in the axial direction X. It is noted that an outer diameter of the roller portion 202R is constant across an entire length thereof in the axial direction X when the support member 206 is non-pressurized state in the present exemplary embodiment.

When the support member 206 is pressurized as illustrated in FIG. 5B, the center portion of the support member 206 is deformed so as to separate from the roller portion 202R. At this time, the contact surface 206*a* of the support member 206 is deformed such that the center portion 206*b* is separated from the roller portion 202R. Because the contact surface 206*a* has been formed in advance such that the center portion 206*b* is curved toward the roller portion 202R in the non-pressurized state, the contact surface 206*a* assumes a shape close to a flat plane along the axial direction X in the pressurized state. As a result, it is possible to reduce the wavy deformation of the reflecting plate 205 supported by the support member 206 and to suppress the uneven gloss.

It is noted that the distance between the contact surface 206*a* and the outer circumferential surface of the roller portion 202R is a distance d3 as a third distance at the center position CP when the support member 206 is in the pressurized state and is a distance d4 as a fourth distance at a third position P3. At this time, because the distance d3 is almost equal to the distance d4, a difference Δ7 between the distance d3 and the distance d4 is smaller than a distance Δ1 between the distance d2 and the distance d1. That is, the following equation holds:

$$\Delta 2=(d4-d3)<\Delta 1=(d2-d1)$$

Confirmation results of waviness of the reflecting plate 205 and the uneven gloss caused by the uneven heat in the present exemplary embodiment, i.e., in the first exemplary embodiment, and the comparative example described in FIGS. 3A and 3B will be described below. While the contact surface 1206*a* of the support member 1206 in the comparative example is approximately a flat plane in the non-pressurized state, the contact surface 206*a* of the support member 206 of the first exemplary embodiment is the normal crown shape in the non-pressurized state.

Evaluations in the first exemplary embodiment and the comparative example were made under the following conditions:

Environment: 23° C./50% RH

Body part: throughput 27 ppm (A4), process speed 148 mm/sec.

Sheet: leaving paper which is a LTR size HP, Brochure Paper 200 Glossy (200 g/m$^2$ of grammage) is left in a RH environment of 23° C./50% for 48 hours or more.

Print image: entirely-black image

Deflection amounts of the support members 206 and 1206 were defined as amounts by which the center portions of the contact surfaces 206*a* and 1206*a* of the support members 206 and 1206 are deformed in the direction of separating from the pressurizing roller 202 by shiffing from the non-pressurized state to the pressurized state. Specifically, the abovementioned deflection amount were found by cut-opening the fixing belt 201 within a range not affecting the deflection of the support members 206 and 1206 and by measuring shapes of the support members 206 and 1206 before and after pressurization by a height gage.

A deflection amount of the reflecting plate 205 was defined to be an amount by which the center portion in the axial direction X of the reflecting plate 205 is deformed in the direction of separating from the pressurizing roller 202 by shiffing from the non-pressurized state to the pressurized state. Specifically, the deflection amount was found by removing the halogen lump 203 while paying an attention so as not affect the deflection of the reflecting plate 205 and by measuring the shape of an inner surface of the reflecting plate 205 before and after pressurization by a height gage from both longitudinal ends.

The waviness of the reflecting plate 205 was confirmed by visually observing the inner surface of the reflecting plate 205 from the axial direction X when the support members 206 and 1206 are in the pressurized state. Still further, the uneven gloss caused by the uneven heat was confirmed by visually observing the whole black image after printing.

Table 1 indicates the deflection amounts of the support members, the deflection amounts of the reflecting plates, waviness of the reflecting plates and the uneven gloss caused by the uneven heat of the first exemplary embodiment and the comparative example evaluated by the above mentioned methods:

TABLE 1

| | DEFLECTION AMOUNT OF SUPPORT MEMBER | DEFLECTION AMOUNT OF REFLECTING PLATE | WAVINESS OF REFLECTING PLATE | UNEVEN GLOSS CAUSED BY UNEVEN HEAT |
|---|---|---|---|---|
| FIRST EXEMPLARY EMBODIMENT | 350 μm | 0 μm | UNABLE TO VISIBLY OBSERVE | UNABLE TO VISIBLY OBSERVE |
| COMPARATIVE EXAMPLE | 350 μm | 350 μm | VISIBLY OBSERVED | VISIBLY OBSERVED |

It was confirmed from Table 1 that the waviness of the reflecting plate 205 is reduced and the uneven gloss caused by the uneven heat is suppressed in the first exemplary embodiment.

As described above, according to the present exemplary embodiment, the contact surface 206*a* is formed such that the closer to the center portion 206*b* in the axial direction X, the closer to the roller portion 202R of the pressurizing roller 202 is when the support member 206 is in the non-pressurized state. This arrangement makes it possible to reduce image defects such as uneven gloss.

Modified Example

Figure 6:
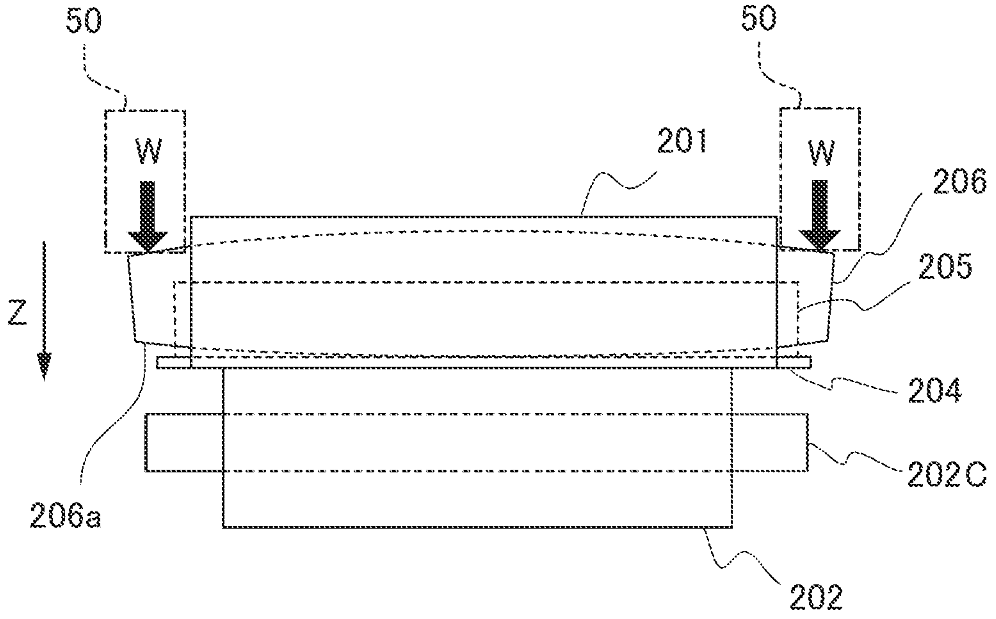
FIG. 6 is a schematic diagram illustrating a fixing apparatus according to a modified example.

FIG. 6 is a schematic diagram illustrating a fixing apparatus of a modified example of the first exemplary embodiment. As illustrated in FIG. 6, the present modified example includes change mechanisms 50 in addition to the configuration of the first exemplary embodiment described above. The change mechanism 50 is configured to change the load in the pressurization direction Z against the support member 206, i.e., a pressurizing force. The change mechanism 50 can change magnitude of the load depending on a state of the printer 1, on a type of a sheet to be printed and on a job for example.

Then, the reflecting plate 205 is not fixed to the support member 206 in the pressurization direction Z in the present modified example. For instance, in a case where the load W1 acts on the both end portions in the axial direction X of the support member 206 as a first pressurizing force, the reflecting plate 205 comes into contact with the contact surface 206*a* of the support member 206 across the entire length thereof in the axial direction X. Meanwhile, in a case where a load W2 acts as a second pressurizing force which is smaller than the load W1 on the both end portions in the axial direction X of the support member 206, the both end portions in the axial direction X of the reflecting plate 205 separate from the contact surface 206*a* of the support member 206.

Even if the load acting on the support member 206 is changed by the change mechanism 50 by thus not fixing the reflecting plate 205 to the support member 206 in the pressurization direction Z, the reflecting plate 205 is less influenced in terms of its deformation. Therefore, this arrangement makes it also possible to suppress the reflecting plate 205 from being deformed or destroyed.

Note that a configuration of changing the load applied to the support member 206 by using a rotary cam for example may be applied to the change mechanism 50.

Second Exemplary Embodiment

Next, a second exemplary embodiment of the present disclosure will be described. The second exemplary embodiment is configured by changing the support member and the pressurizing roller of the first exemplary embodiment. Therefore, same component elements with those of the first exemplary embodiment will be described while omitting their illustration or by denoting them with the same reference signs.

Figure 7A:
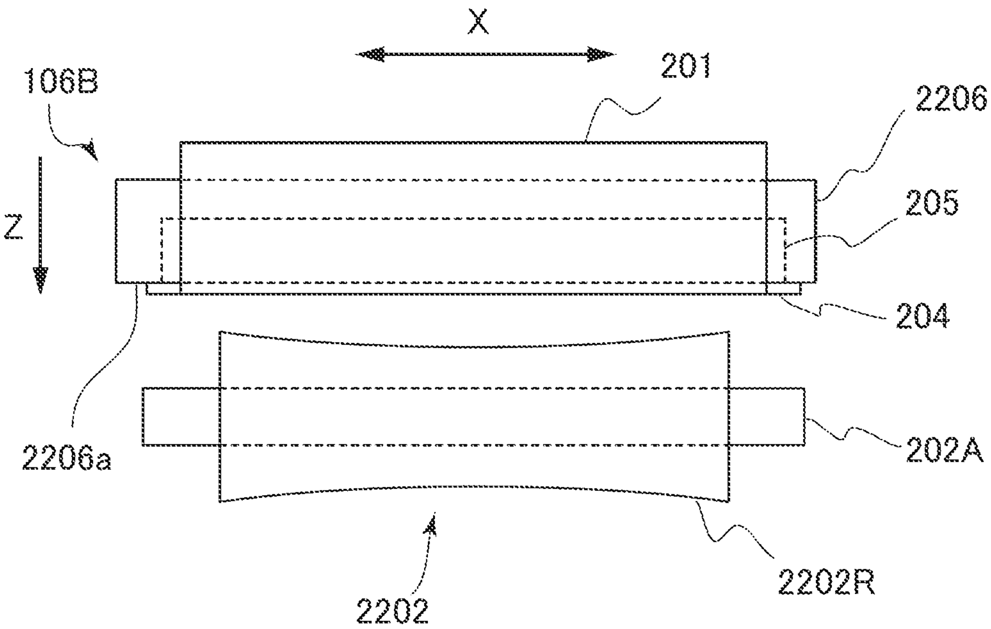
FIG. 7A is a schematic diagram illustrating a fixing apparatus of a second exemplary embodiment in a non-pressurized state seen from the sheet conveyance direction.
Figure 7B:
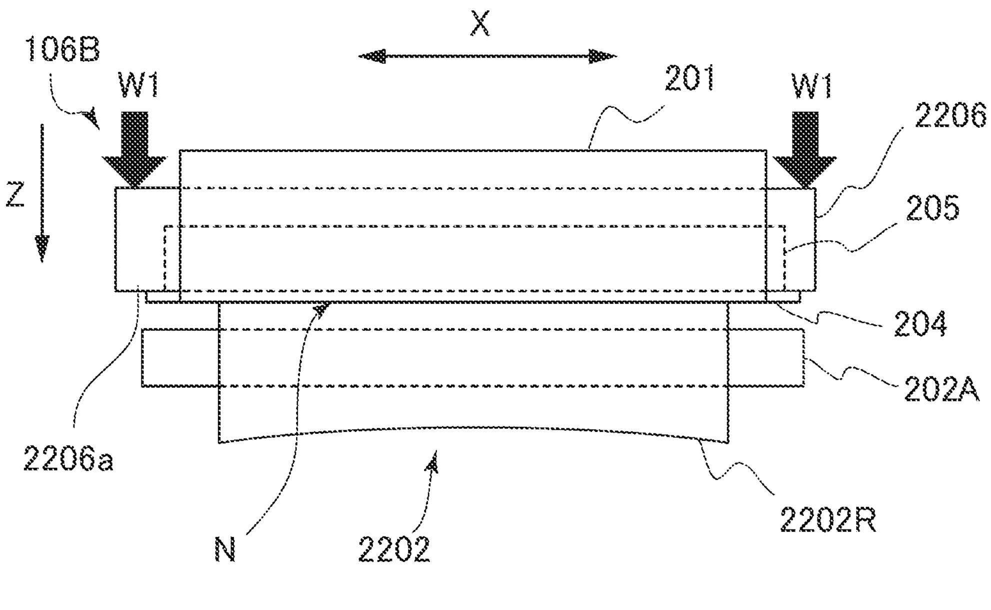
FIG. 7B is a schematic diagram illustrating the fixing apparatus of the second exemplary embodiment in a pressurized state seen from the sheet conveyance direction.

FIG. 7A is a schematic diagram of a fixing apparatus 106B of the second exemplary embodiment in the non-pressurized state seen from the sheet conveyance direction Y and FIG. 7B is a schematic diagram of the fixing apparatus 106B in the pressurized state seen from the sheet conveyance direction Y.

The fixing apparatus 106B of the present exemplary embodiment includes a support member 2206 and a pressurizing roller 2202. The pressurizing roller 2202 includes a core metal 202A and a roller portion 2202R attached around the core metal 202A. The roller portion 2202R serving as a second rotary member is configured such that the closer to a center portion in the axial direction X thereof, the smaller an outer diameter thereof is. That is, the roller portion 2202R is formed into an inverse crown shape such that an outer diameter of the center portion, in the axial direction X, of the roller portion 2202R is smaller than each of outer diameters of end portions, in the axial direction X, of the roller portion 2202R.

Meanwhile, the support member 2206 includes a contact surface 2206*a* in contact with the reflecting plate 205 in the pressurized state. The contact surface 2206*a* extends in parallel with the axial direction X when the support member 2206 is in the non-pressurized state.

As illustrated in FIG. 7B, when the support member 2206 is pressurized, the nip member 204 presses the roller portion 2202R of the pressurizing roller 2202 through the fixing belt 201. Because the roller portion 2202R of the present exemplary embodiment has the inverse crown shape, the closer to the center portion in the axial direction X, the weaker a nip pressure of the nip portion N becomes.

Therefore, the support member 2206 deflects less and the reflecting plate 205 also deflects less. As a result, waviness of the reflecting plate 205 is reduced and uneven gloss caused by uneven heat is also reduced similarly to the first exemplary embodiment.

An effect for suppressing the uneven gloss in the present exemplary embodiment, i.e., in the second exemplary embodiment, was actually confirmed. The contact surface 2206*a* of the support member 2206 is approximately a flat plane in the non-pressurized state, and an inverted crown amount of the roller portion 2202R in the non-pressurized state is 350 μm. Note that the inverted crown amount corresponds to a half of a difference between the outer diameter of the both end portions in the axial direction X of the roller portion 2202R and the outer diameter of the center portion thereof.

Evaluations of the second exemplary embodiment was made under the same conditions with those of the first exemplary embodiment. Table 2 indicates the deflection amount of the support member, the deflection amount of the reflecting plate, waviness of the reflecting plates and the uneven gloss caused by the uneven heat of the second exemplary embodiment:

TABLE 2

| | DEFLECTION AMOUNT OF SUPPORT MEMBER | DEFLECTION AMOUNT OF REFLECTING PLATE | WAVINESS OF REFLECTING PLATE | UNEVEN GLOSS CAUSED BY UNEVEN HEAT |
|---|---|---|---|---|
| SECOND EXEMPLARY EMBODIMENT | 50 μm | 50 μm | UNABLE TO VISIBLY OBSERVE | UNABLE TO VISIBLY OBSERVE |

It was confirmed from Table 2 that the waviness of the reflecting plate 205 is reduced and the uneven gloss caused by the uneven heat is suppressed in the second exemplary embodiment. Therefore, it is possible to reduce image defects.

Third Exemplary Embodiment

Next, a third exemplary embodiment of the present disclosure will be described. The third exemplary embodiment is what the configuration of the fixing apparatus of the first exemplary embodiment is changed. Therefore, same component elements with those of the first exemplary embodiment will be described while omitting their illustration or by denoting them with the same reference signs.

By the way, the stay supports the nip plate through the flange portion of the reflection member in the fixing apparatus described in Japanese Patent Application Laid-open No. 2014-66851. The nip plate, the reflection member and the stay are formed of metal. When the stiff metals come into contact with each other, they tend to cause non-uniformity of pressure because they cannot mutually follow irregularity and others on surfaces of the metals. Thereby, non-uniformity is generated in a distribution of nip pressure at the nip portion, possibility causing image defects such as uneven gloss. The third exemplary embodiment is one example for solving such problem.

Fixing Apparatus

Figure 8:
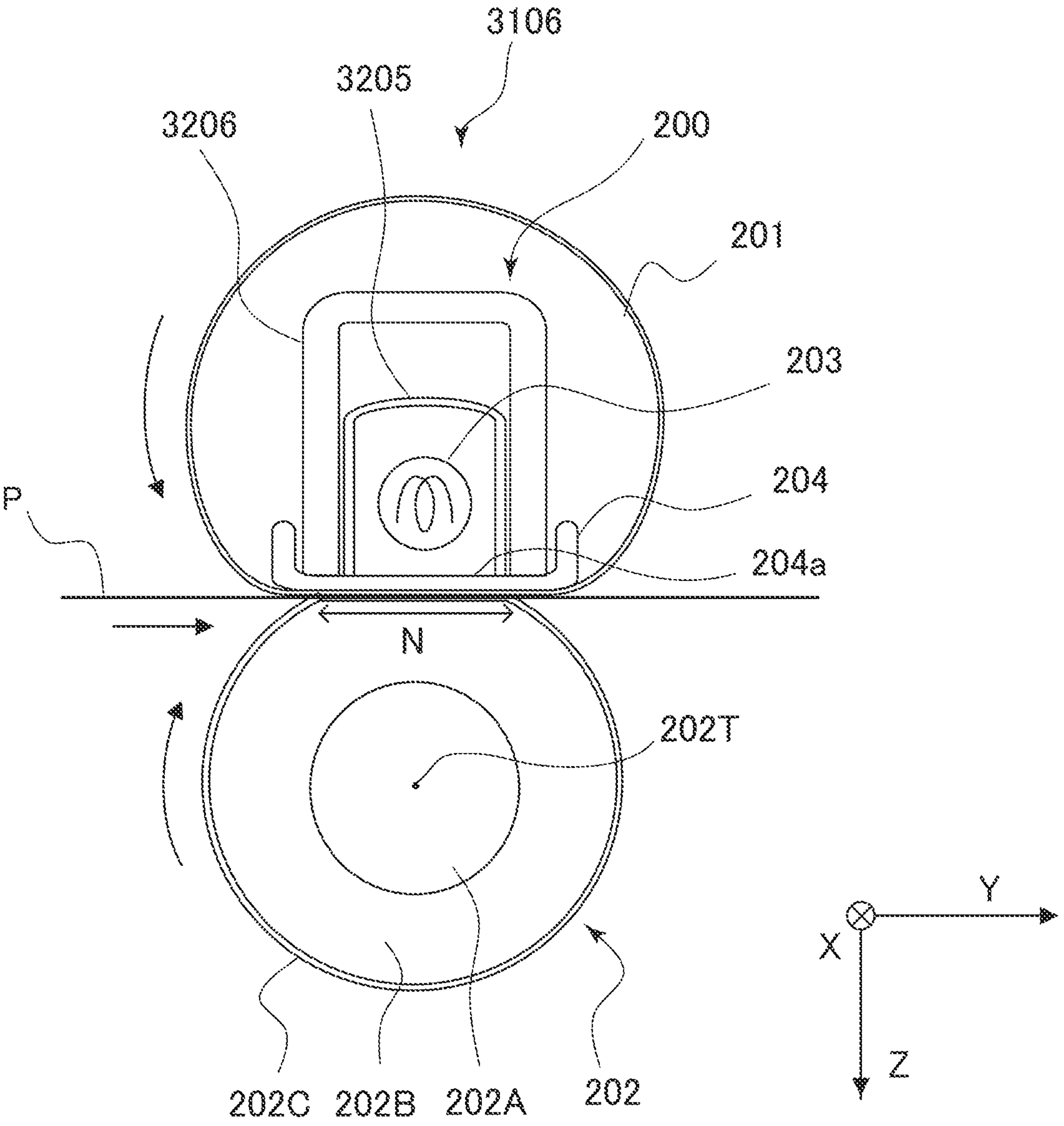
FIG. 8 is a section view illustrating a fixing apparatus of a third exemplary embodiment.

As illustrated in FIG. 8, a fixing apparatus 3106 of the third exemplary embodiment includes a fixing belt 201 which is formed to be endless, a heating unit 200 for heating the fixing belt 201 and a pressurizing roller 202 sandwiching the fixing belt 201 with the heating unit 200. Note that the fixing belt 201 may be a thin film-like member.

The fixing belt 201 serving as a first rotary member is a flexible endless belt made of a highly heat conductive and low thermal capacity polyimide resin. Note that the fixing belt 201 may be formed of other resin or of metal such as stainless steel.

The fixing belt 201 is provided to be rotatable and lubricant is applied on an inner circumferential surface of the fixing belt 201 to assure slidability with a nip member 204 described later. Then, guide members not illustrated are provided on both end portions in a rotation axial direction (referred to as an axial direction X hereinafter) of the fixing belt 201 to guide the rotation of the fixing belt 201 and to restrict the fixing belt 201 from moving in the rotation axial direction.

The heating unit 200 is disposed on an inner circumferential side of the fixing belt 201 and includes a halogen lump 203, a nip member 204, a reflecting plate 3205 and a support member 3206. The halogen lump 203 serving as a heating element is disposed with a space from the fixing belt 201 and the nip member 204 so as to emit radiant heat and to heat the fixing belt 201. Temperature of the radiant heat of the halogen lump 203 changes depending on a supply amount supplied from a power source not illustrated. In a case of the present exemplary embodiment, the temperature of the radiant heat emitted by the halogen lump 203 is adjusted in accordance to control of the supply amount made by a control portion not illustrated such that temperature of a nip portion N detected by a temperature sensor not illustrated is kept at a predetermined temperature. Note that the heating element is not limited to the halogen ramp and may be another heating element.

The nip member 204 is a lengthy member provided to be non-rotational with respect to the rotary fixing belt 201 and extending in the axial direction X slidably with the inner circumference of the fixing belt 201. While the halogen lump 203 emits radiant heat to heat the fixing belt 201, the nip member 204 receives the radiant heat from the halogen lump 203 at that time as described above. That is, the nip member 204 includes a heat receiving surface 204*a* facing to the halogen lump 203 to receive the radiant heat from the halogen lump 203.

The reflecting plate 3205 is a member for reflecting the radiant heat emitted from the halogen lump 203 toward the nip member 204 and is disposed with a predetermined distance from the halogen lump 203 so as to cover the halogen lump 203. Due to that, the reflecting plate 3205 is formed of an aluminum plate for example having large reflectivity of infrared rays and far infrared rays by curving such that a sectional face thereof is formed into an approximately U-shape. The radiant heat from the halogen lump 203 can be efficiently utilized and the radiant heat nip portion N can be heated up quickly through the nip member 204 by being able to collect the radiant heat from the halogen lump 203 to the nip member 204 by the reflecting plate 3205. Note that the reflecting plate 3205 may be omitted.

The support member 3206 is a structure having a predetermined stiffness to support the nip member 204 and is formed into a shape running along an outer surface of the reflecting plate 3205 by using metal excellent in strength such as stainless steel and spring steel. More specifically, the support member 3206 supports both end portions of the nip member 204 in the sheet conveyance direction Y which is a short hand direction of the nip member 204. In a case of the present exemplary embodiment, the fixing belt 201 is pressed from inside toward the pressurizing roller 202 by the nip member 204 supported by the support member 3206 to be able to form the nip portion N more reliably.

The pressurizing roller 202 serving as a second rotary member abuts with an outer circumferential surface of the fixing belt 201 and is rotatably supported. In the present exemplary embodiment, the pressurizing roller 202 is rotated with a predetermined peripheral velocity in a direction of an arrow in FIG. 8 by a driving motor not illustrated. Then, due to a frictional force generated at the nip portion N, a rotation force of the pressurizing roller 202 is transmitted to the fixing belt 201. Thus, the fixing belt 201 is driven by the pressurizing roller 202. That is, a so-called pressure roller driving system is adopted in the present exemplary embodiment. The pressurizing roller 202 is constructed by forming an elastic layer 202B around a metallic core metal 202A serving as a rotation shaft and by forming a releasing layer 202C formed of fluorine resin such as PTFE, PFA and FEP around the elastic layer 202B. The elastic layer 202B contains voids therein.

The core metal 202A is rotatably supported by bearing portions not illustrated that support both end portions in the axial direction X of the core metal 202A. Then, the support member 3206 pressurizes the nip member 204 in the pressurization direction Z to press the fixing belt 201 toward the pressurizing roller 202. Thereby, a surface of the pressurizing roller 202 elastically deforms and the nip portion N having a predetermined width in terms of the sheet conveyance direction Y is formed by the surface of the pressurizing roller 202 and the surface of the fixing belt 201.

It is noted that the pressurization direction Z is a direction orthogonal to the axial direction X and the sheet conveyance direction Y. It is also possible to arrange such that the nip member 204 is not pressurized in the pressurization direction Z and such that the pressurizing roller 202 is pressurized toward the nip member 204. Still further, the nip member 204 is not limited to be what comes into direct contact with the fixing belt 201 and may be what comes into contact with the fixing belt 201 through a sheet member having high thermal conductivity such as iron alloy and aluminum.

The nip member 204 is heated up by the radiant heat emitted from the halogen lump 203 and by the radiant heat reflected by the reflecting plate 3205 to increase temperature of the fixing belt 201 as described above. The sheet P on which a non-fixed toner image has been formed undergoes heating and pressurization at the nip portion N by being nipped and conveyed by the rotating fixing belt 201 and the pressurizing roller 202 so as to fix the toner image onto the sheet P Low Elastic Member Next, a low elastic member 207 disposed between the support member 3206 and the nip member 204 will be described with reference to FIGS. 8 through 9B. By the way, the support member 3206 pressurizes the nip member 204 in the pressurization direction Z to form the nip portion N between the fixing belt 201 and the pressurizing roller 202. Therefore, the support member 3206 and the nip member 204 need to have predetermined stiffness and are often made of metal as their material.

In such a case, the support member 3206 and the nip member 204, i.e., metals, come into contact with each other. Because the metals cannot follow irregularities on metal surfaces with each other when the stiff metals come into contact with each other, pressure unevenness is liable to occur. If unevenness occurs in the contact, unevenness occurs in pressurizing the nip member 204 by the support member 3206, so that unevenness occurs also in a distribution of the pressurizing force between the nip member 204 and the pressurizing roller 202, thus causing uneven gloss in a toner image.

Then, according to the present exemplary embodiment, the low elastic member 207 made of polyimide resin is disposed between the support member 3206 and the nip member 204 in the pressurization direction Z. The low elastic member 207 has a low elastic modulus as compared to those of the support member 3206 and the nip member 204. Therefore, the low elastic member 207 is sandwiched between the support member 3206 and the nip member 204 in the pressurization direction Z with a predetermined pressurizing force and follows the shapes of the support member 3206 and the nip member 204. This arrangement makes it possible to smooth transmission of the pressurizing force from the support member 3206 to the nip member 204.

More specifically, the support member 3206 extends in the axial direction X across an entire length of a sheet passing region and is formed into a U-shape in section. The support member 3206 includes side walls 3206*b* and 3206*c* extending in the pressurization direction Z and a connecting portion 3206*a* extending in the sheet conveyance direction Y so as to connect these side walls 3206*b* and 3206*c*.

The low elastic member 207 extends in the axial direction X across the entire length of the sheet passing region and is formed into a U-shape in section such that an opening portion faces the support member 3206. Then, the low elastic members 207 are attached to edge portions of the side walls 3206*b* and 3206*c* of the support member 3206, respectively. The low elastic members 207 attached respectively to the side walls 3206*b* and 3206*c* are composed of identical members, and the following description will be made mainly on the side wall 3206*b* and the low elastic member 207 attached to the side wall 3206*b*.

The low elastic member 207 includes side walls 207*b* and 207*c* extending in the pressurization direction Z and a connecting portion 207*a* serving as an elastic portion extending in the sheet conveyance direction Y so as to connect these side walls 207*b* and 207*c*. The side wall 3206*b* of the support member 3206 includes a contact surface 3206*d* coming into contact with the connecting portion 207*a* of the low elastic member 207. Because the side wall 3206*b* of the support member 3206 is sandwiched by the side walls 207*b* and 207*c* of the low elastic member 207, it is possible to reduce displacement of the low elastic member 207 in the sheet conveyance direction Y. A height of the contact surface 3206*d* of the support member 3206 in the pressurization direction Z is constant across the entire length thereof in the axial direction X.

By the way, in a case where the low elastic member having the constant sectional shape in the axial direction X is used for example, a shape of the nip portion N in the pressurized state becomes constant in the axial direction X. It is a problem how to suppress paper wrinkles in fixing a toner image onto the sheet Pat the nip portion N. Because the paper wrinkles are generated by being pressurized in a state in which the sheets P overlap within the nip portion N, it is necessary to generate a force that spreads the sheet in a direction from a center portion to end portions in the axial direction X at the nip portion N in order to suppress such paper wrinkles.

Then, according to the present exemplary embodiment, a thickness of the connecting portion 207*a* of the low elastic member 207 is differentiated at the center portion and the end portions in the axial direction X so that a sheet conveyance speed increases at the end portions more than that at the center portion in the axial direction X at the nip portion N.

More specifically, the connecting portion 207*a* of the low elastic member 207 includes a center portion 207*f* in the axial direction X and an end portion 207*g* in the axial direction X. The center portion 207*f* serving as a first part and the end portion 207*g* serving as a second part are located at positions different from each other in the axial direction X. Still further, the center portion 207*f* is located near the center portion of the connecting portion 207*a* more than the end portion 207*g* in the axial direction X. Then, the low elastic member 207 is arranged such that a thickness h1 in the pressurization direction Z of the center portion 207*f* is thicker than a thickness h2 in the pressurization direction Z of the end portion 207*g*.

In a case where the pressurizing roller 202 is a balloon roller including the elastic layer 202B having voids inside, the more the pressurizing roller 202 is squashed, the closer a distance between the roller surface and the core metal 202A becomes and the slower the sheet conveyance speed becomes. That is, because the thickness h1 of the center portion 207*f* of the low elastic member 207 is thicker than the thickness h2 of the end portion 207*g*, the nip member 204 follows the shape of the low elastic member 207. Then, because the pressurizing roller 202 is pressed by the nip member 204 having the center portion bulged downward, the center portion in the axial direction X of the pressurizing roller 202 is squashed significantly more than the end portions in the axial direction X. Due to that, the sheet conveyance speed in the nip portion N at the both end portions in the axial direction X becomes faster than that at the center portion, so that the paper wrinkles can be suppressed.

Here, in order to compare whether paper wrinkles and uneven gloss are generated, low elastic members to be disposed between the support member 3206 and the nip member 204 and made of two kinds of different materials are prepared. Table 3 indicates structural contents of the low elastic members structured by these two kinds of different materials respectively as a comparative example and a third exemplary embodiment:

TABLE 3

| STRUCTURE | MATERIAL | LONGITUDINAL SHAPE |
|---|---|---|
| THIRD EXEMPLARY EMBODIMENT | POLYIMIDE RESIN | CENTER PORTION IS THICKER THAN LONGITUDINAL END PORTIONS |
| COMPARATIVE EXAMPLE | ALUMINUM | CENTER PORTION IS THICKER THAN LONGITUDINAL END PORTIONS |

Figure 9A:
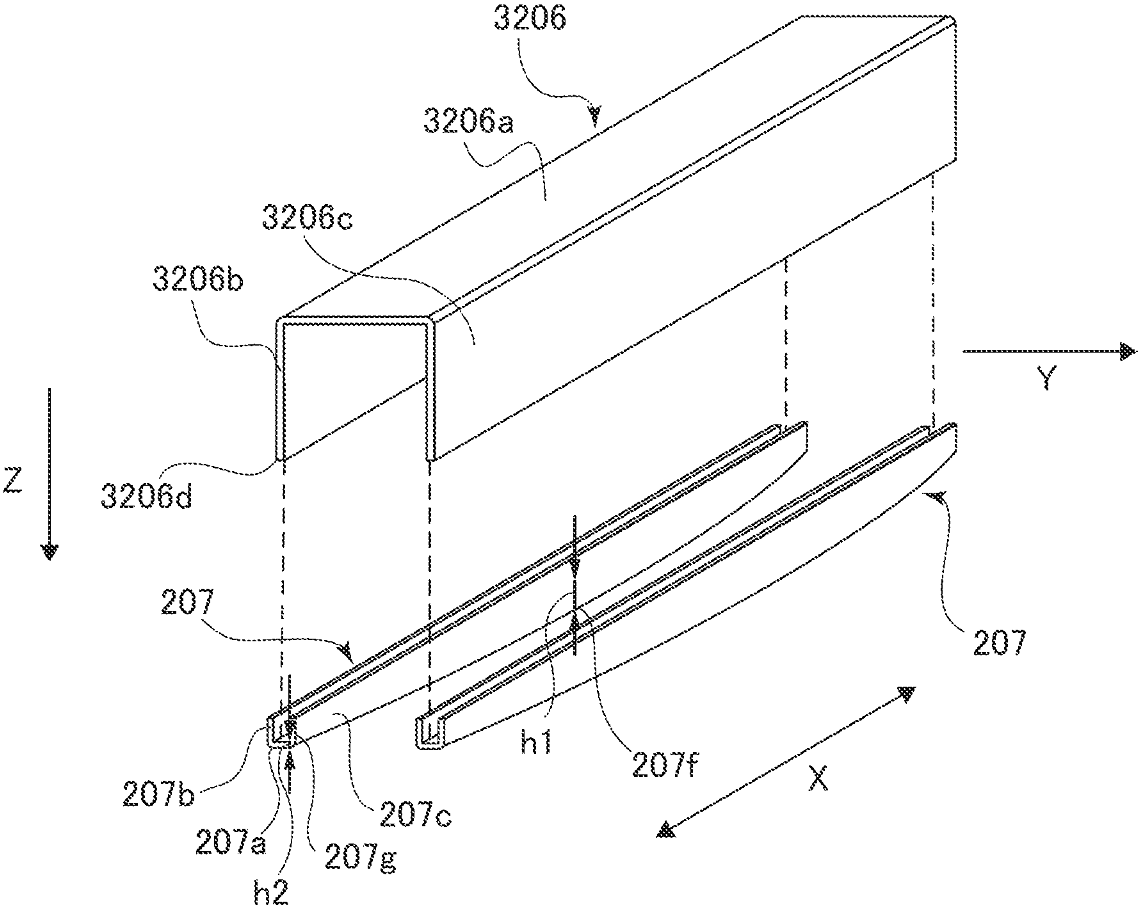
FIG. 9A is an exploded perspective view illustrating a support member and a low elastic member.
Figure 9B:
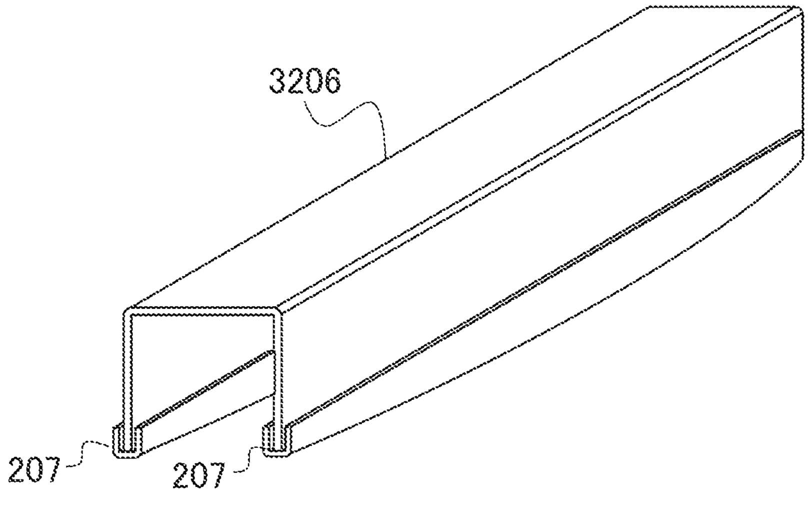
FIG. 9B is a perspective view illustrating the support member and the low elastic member assembled with each other.

The low elastic member of the comparative example is made of aluminum and the low elastic member of the third exemplary embodiment is made of polyimide resin which is an arrangement of the present exemplary embodiment. Longitudinal shapes, i.e., shapes in the axial direction X of the low elastic members are as illustrated in FIG. 9 in which the thickness of the longitudinal center portion is thicker than that of the longitudinal end portions both in the comparative example and the third exemplary embodiment. Specifically, a thickness in a sheet thickness direction of the longitudinal center portion of the connecting portion 207*a* is 2.3 mm and a thickness of the longitudinal end portions are 2.0 mm.

Evaluation of paper wrinkles was made under the following conditions:

Environment: high temperature and high humidity environment (30° C./80% RH, referred to as H/H environment hereinafter)

Body part: throughput 27 ppm (A4), process speed: 148 mm/sec.

Sheet (plain sheet of paper): leaving paper which is A4-size Red Label manufactured by Oce (80 g/m$^2$ of grammage) is left in the H/H environment for 48 hours or more.

Sheet (thin sheet of paper): leaving paper which is A4-size sheet CS-060F manufactured by Canon Inc. (60 g/m$^2$ of grammage) is left in the H/H environment for 48 hours or more.

Print image: entirely-white image

Method for judging whether paper wrinkles have occurred: A whole bunch of sheets fed was confirmed by touching by hands, and even if one sheet among 30 fed sheets generates paper wrinkles, it is marked as "K" and if no paper wrinkle is generated, it is marked as "O".

Evaluation of uneven gloss was made under the following conditions:

Environment: high temperature and high humidity environment (30° C./80% RH)

Body part: throughput 27 ppm (A4), process speed 148 mm/sec.

Sheet (plain sheet of paper): leaving paper which is a LTR-size HP, Brochure Paper 200 Glossy (200 g/m$^2$ of grammage) manufactured by HP is left in the H/H environment for 48 hours or more.

Print image: entirely-black image

Judgment whether uneven gloss has occurred: It is marked as "K" if uneven gloss is visibly observed on a uniform solid black image and is as "O" if no uneven gloss is visually observed.

Table 4 indicates relationships between the occurrence of paper wrinkles and uneven gloss of the comparative example and the third exemplary embodiment:

TABLE 4

| | PAPER WINKLES (PLAIN SHEET) | PAPER WRINKLES (THIN SHEET) | UNEVEN GLOSS |
|---|---|---|---|
| THIRD EXEMPLARY EMBODIMENT | ○ | ○ | ○ |
| COMPARATIVE EXAMPLE | ○ | ○ | X |

Because both of the comparative example and the third exemplary embodiment are structured such that the center portion is thicker than the longitudinal end portions, an amount of squash of the pressurizing roller 202 of the longitudinal end portions is smaller than that of the longitudinal center portion and the sheet conveyance speed becomes faster. Therefore, because a force of spreading the sheet in the longitudinal end direction is high, no paper wrinkles occurred either in the plain sheet of paper and in the thin sheet. Because aluminum is used in the comparative example and contact property with stiff metal is low, the pressurizing force from the support member 3206 cannot be uniformly transmitted to the nip member 204, thus causing uneven gloss.

Because the polyimide resin having a lower elastic modulus than those of metals is used in the third exemplary embodiment, contact property with the metal was favorable. Then, because the pressurizing force from the support member 3206 can be smoothly transmitted to the nip member 204, no uneven gloss occurred.

Uneven gloss can be reduced by disposing the low elastic member 207 between the support member 3206 and the nip member 204 composed of the metals as described above. The thickness of the low elastic member 207 is also arranged such that the thickness h1 of the center portion 207*f* in the axial direction X of the low elastic member 207 is thicker than the thickness h2 of the end portion 207*g*. In other words, the low elastic member 207 serving as the elastic member is arranged such that the thickness in the pressurization direction Z is gradually lessened from the center portion to the both end portions in the axial direction X. Accordingly, this arrangement makes it possible to suppress paper wrinkles from being generated and to reduce image defects such as uneven gloss and paper wrinkles While the low elastic member 207 having the longitudinal center portion of 2.3 mm thick and the longitudinal end portions of 2.0 mm thick was used in the present exemplary embodiment, the low elastic member 207 needs to have certain strength or more to reduce the uneven pressure within the nip portion N. Therefore, the low elastic member 207 is preferable to have a thickness 1.0 mm or more even at a longitudinal thin part thereof.

Modified Example

Figure 10A:
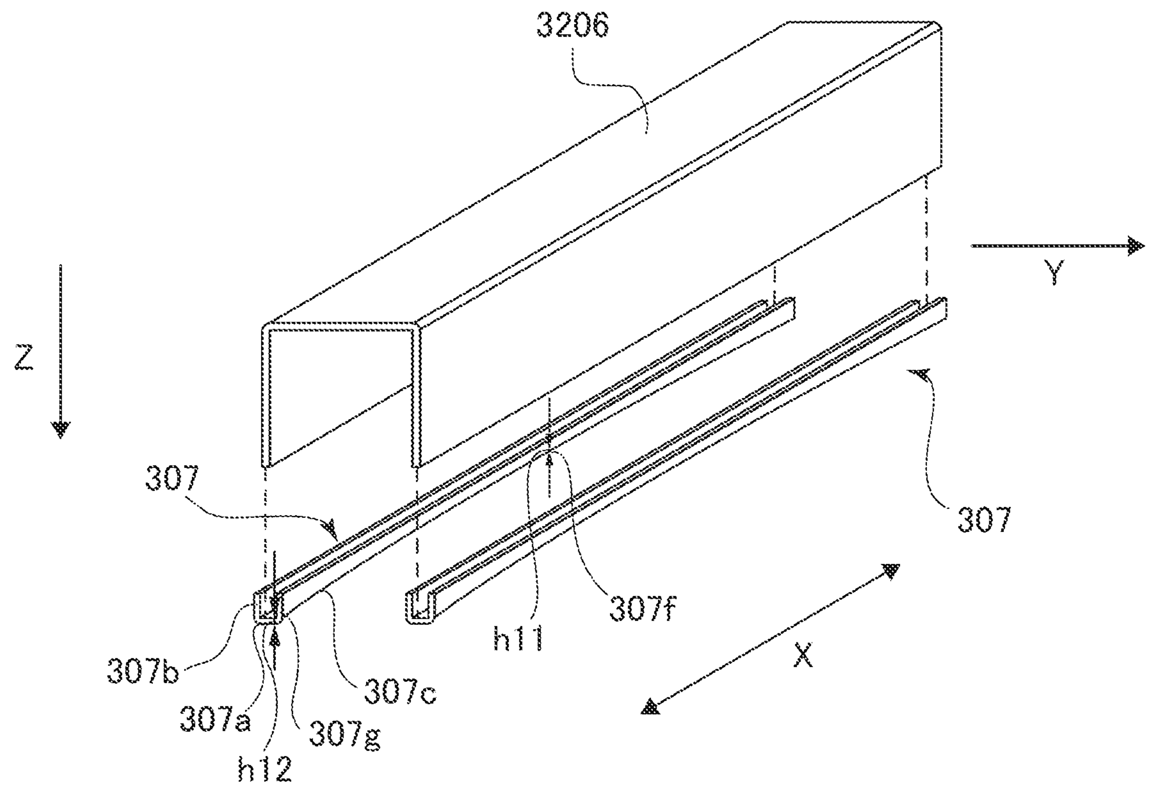
FIG. 10A is an exploded perspective view illustrating a support member and a low elastic member of a modified example of the third exemplary embodiment.
Figure 10B:
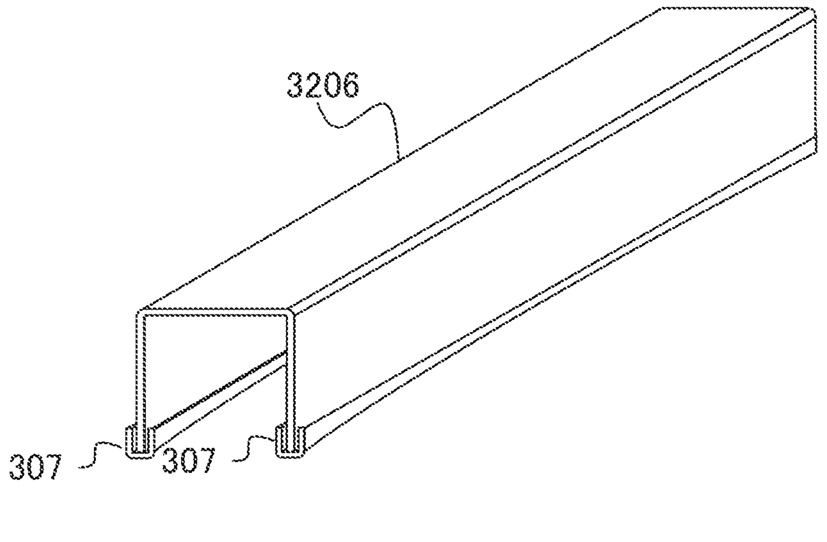
FIG. 10B is a perspective view illustrating the support member and the low elastic member assembled with each other.

FIGS. 10A and 10B illustrate a modified example of the third exemplary embodiment. A connecting portion 307*a* serving as an elastic portion of a low elastic member 307 illustrated in FIGS. 10A and 10B includes a center portion 307*f* in the axial direction X and an end portion 307*g* in the axial direction X. The center portion 307*f* serving as a second part and the end portion 307*g* serving as a first part are located at positions different from each other in the axial direction X. Still further, the center portion 307*f* is located near a center portion of the connecting portion 307*a* more than the end portion 307*g* in the axial direction X.

Then, the connecting portion 307*a* is arranged such that a thickness h11 of the center portion 307*f* in the axial direction X is thinner than a thickness h12 of the end portion 307*g*. In other words, the thickness in the pressurization direction Z of the connecting portion 307*a* of the low elastic member 307 increases gradually from the center portion to the both end portions. Therefore, a nip width of the both end portions in the axial direction X at the nip portion N can be increased more than that of the center portion and fixability of the both end portions of the nip portion N can be improved.

Fourth Exemplary Embodiment

Next, a fourth exemplary embodiment of the present disclosure will be described. The fourth exemplary embodiment is configured by changing the support member and the low elastic member of the third exemplary embodiment. Therefore, same component elements with those of the third exemplary embodiment will be described while omitting their illustration or by denoting them with the same reference signs.

Figure 11A:
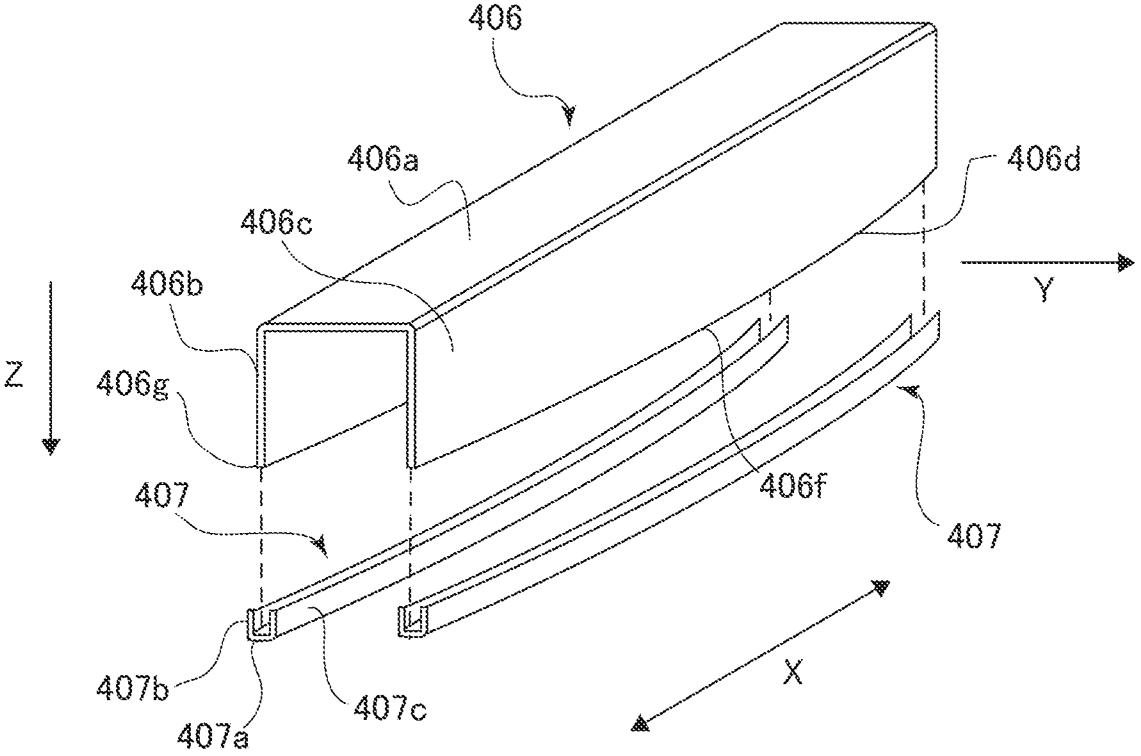
FIG. 11A is an exploded perspective view illustrating a support member and a low elastic member of a fourth exemplary embodiment.
Figure 11B:
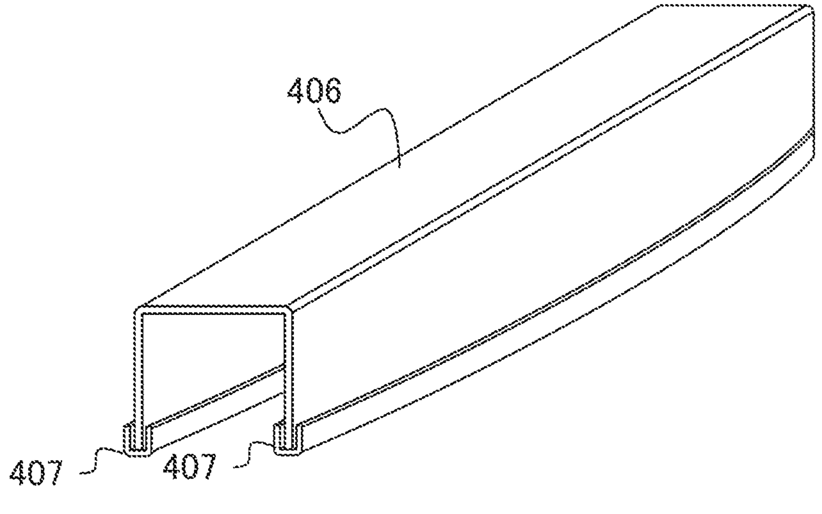
FIG. 11B is a perspective view illustrating the support member and the low elastic member assembled with each other.

As illustrated in FIGS. 11A and 11B, a support member 406 extends in the axial direction X across an entire length of a sheet passing region and is formed into a U-shape in section. The support member 406 includes side walls 406*b* and 406*c* extending in the pressurization direction Z and a connecting portion 406*a* extending in the sheet conveyance direction Y so as to connect these side walls 406*b* and 406*c*.

The low elastic member 407 made of polyimide resin extends in the axial direction X across the entire length of the sheet passing region and is formed into a U-shape in section such that an opening portion faces the support member 406. Then, the low elastic members 407 are attached to edge portions of the side walls 406*b* and 406*c* of the support member 406, respectively. The low elastic members 407 attached respectively to the side walls 406*b* and 406*c* are composed of identical members, and the following description will be made mainly on the side wall 406*b* and the low elastic member 407 attached to the side wall 406*b*.

The low elastic member 407 includes side walls 407*b* and 407*c* extending in the pressurization direction Z and a connecting portion 407*a* serving as an elastic portion extending in the sheet conveyance direction Y so as to connect these side walls 407*b* and 407*c*. The side wall 406*b* of the support member 406 includes a contact surface 406*d* coming into contact with the connecting portion 407*a* of the low elastic member 407. Because the side wall 406*b* of the support member 406 is sandwiched by the side walls 407*b* and 407*c* of the low elastic member 407, it is possible to reduce displacement of the low elastic member 407 in the sheet conveyance direction Y.

Height of the contact surface 406*d* of the support member 406 in the pressurization direction Z is not constant across the entire length in the axial direction X. More specifically, the contact surface 406*d* includes a center portion 406*f* in the axial direction X and end portions 406*g* in the axial direction X. The center portion 406*f* serving as a third part and the end portions 406*g* serving as a fourth part are located at positions different in the axial direction X. The center portion 406*f* is near the center portion of the support member 406 rather than the end portions 406*g* in terms of the axial direction X.

Then, the center portion 406*f* is closer to the pressurizing roller 202T (see FIG. 8) of the pressurizing roller 202 than the end portion 406*g* in the pressurization direction Z. That is, the contact surface 406*d* is located at positions gradually far from the pressurizing roller 202T of the pressurizing roller 202 from the center portion 406*f* to the both end portions 406*g* in the axial direction X.

Meanwhile, a thickness in the pressurization direction Z of the connecting portion 407*a* of the low elastic member 407 is constant across the entire length in the axial direction X. That is, the thickness of the connecting portion 407*a* is constant across the entire length thereof in the axial direction X.

In the present exemplary embodiment, the contact surface 406*d* of the support member 406 is arranged such that the center portion 406*f* bulges out more than the end portion 406*g* and the thickness of the connecting portion 407*a* of the low elastic member 407 is made constant. Therefore, the nip member 204 follows the shapes of the contact surface 406*d* of the support member 406 and the low elastic member 407. Then, the pressurizing roller 202 is pressed by the nip member 204 having the center portion bulged downward so that paper wrinkles can be suppressed.

Because the thickness of the connecting portion 407*a* of the low elastic member 407 is made constant, heat escaping to the support member 406 through the nip member 204 can be uniformed in the axial direction X and dispersion of fixability of the nip portion N at each position in the axial direction X can be reduced. Meanwhile, if the height of the contact surface 406*d* of the support member 406 significantly changes, the low elastic member 407 is unable to follow such shape, so that it is necessary to optimize the shape of the contact surface 406*d* by considering flexibility of the low elastic member 407.

Modified Example

Figure 12A:
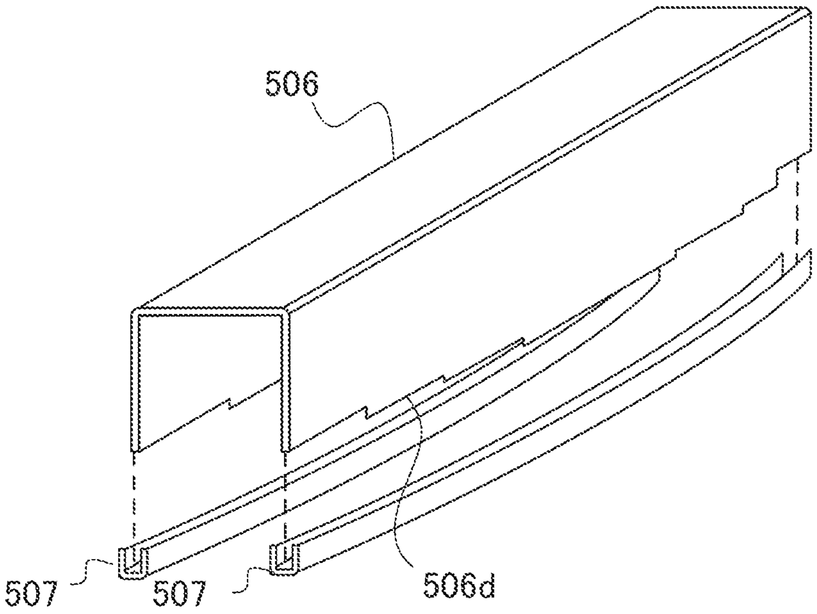
FIG. 12A is an exploded perspective view illustrating a support member and a low elastic member of a modified example of the fourth exemplary embodiment.
Figure 12B:
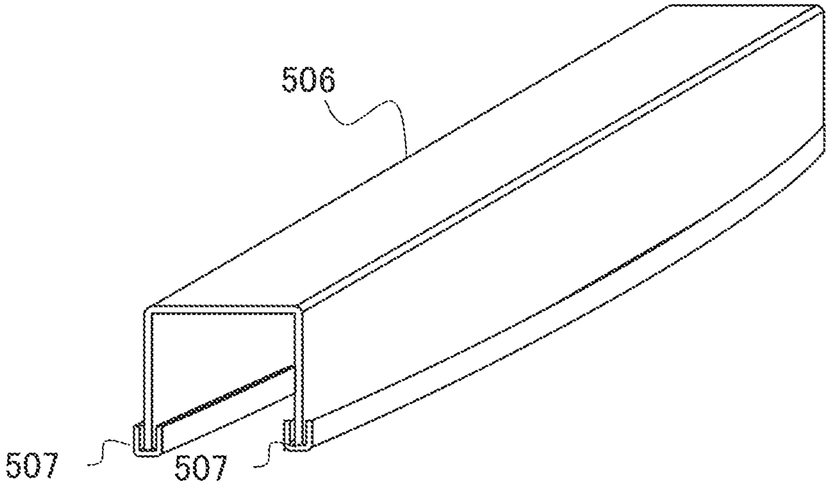
FIG. 12B is a perspective view illustrating the support member and the low elastic member assembled with each other.

FIGS. 12A and 12B illustrate a modified example of the fourth exemplary embodiment. A support member 506 includes a contact surface 506*d* having a plurality of steps. Thus, the shape of the contact surface 506*d* is not limited to what curves with a constant radius of curvature, and the contact surface 506*d* may be arranged such that a center portion is close to the pressurizing roller 202T of the pressurizing roller 202 rather than the both end portions as a whole.

Other Exemplary Embodiment

Although the loads have been applied on the both end portions in the axial direction X in the first and second exemplary embodiments, the present disclosure is not limited to such configuration. For instance, the load may be applied to the support member at inside in the axial direction X of the position illustrated in FIG. 5B.

Still further, the first exemplary embodiment may be combined with the second exemplary embodiment. For instance, the contact surface 206*a* may be constructed with a radius of curvature smaller than that of the first exemplary embodiment and a pressurizing roller 2202 having an inverse crown shape roller portion 2202R with a radius of curvature smaller than that of the second exemplary embodiment. Then, they may be combined with each other.

While the high heat resistant polyimide resin was used as the material of the low elastic member in the third and fourth exemplary embodiments, the present disclosure is not limited to such arrangement. For instance, the low elastic member may be formed of a highly heat resistant material such as resin containing glass balloons. It is possible to prevent the radiant heat from the halogen lump 203 from escaping from the nip member 204 to the support member in increasing temperature of the fixing apparatus by using the highly heat resistant material. Therefore, it is possible to transmit the radiant heat efficiently to the nip portion N and to quicken the rise of the fixing apparatus.

Still further, while the low elastic member is structured so as to come into contact with the support member and the nip member in the third and fourth exemplary embodiments, the present disclosure is not limited to such arrangement. For instance, a flange portion may be formed such that the reflecting plate 3205 faces the contact surface of the support member and the low elastic member may be disposed between the flange portion and the support member.

Still further, while the low elastic member has been formed into the U-shape in section having the two side walls and one connecting portion in the third and fourth exemplary embodiments, the present disclosure is not limited to such arrangement. For instance, the two side walls may be omitted from the low elastic member.

Still further, the connecting portion 207*a* of the low elastic member 207 has been formed such that the thickness gradually decreases from the center portion to the both end portions in the axial direction X in the third exemplary embodiment, the present disclosure is not limited to such arrangement. For instance, the connecting portion 207*a* may be arranged such that the thickness decreases with a plurality of steps from the center portion to the both end portions.

The first through fourth exemplary embodiments and their modified examples may be appropriately combined with each other.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-143875, filed Aug. 27, 2020, Japanese Patent Application No. 2020-143874, filed Aug. 27, 2020, and Japanese Patent Application No. 2021-106746, filed Jun. 28, 2021, which are hereby incorporated by reference herein in their entirety.

What is claimed is:

1. A fixing apparatus comprising:

a first rotary member which is formed to be endless;

a heating element disposed inside of the first rotary member;

a second rotary member in contact with an outer circumferential surface of the first rotary member and forming a nip portion which fixes a toner image onto a sheet together with the first rotary member;

a nip member provided slidably with an inner circumferential surface of the first rotary member so as to nip the first rotary member together with the second rotary member and configured to heat the nip portion by receiving radiant heat from the heating element;

a support member supporting the nip member; and an elastic portion having elastic modulus lower than that of the support member and the nip member, the elastic portion being disposed between the support member and the nip member in a pressurization direction orthogonal to a rotation axial direction of the second rotary member and to a sheet conveyance direction, wherein the elastic portion comprises first and second parts located at positions different from each other in the rotation axial direction, wherein a thickness of the first part in the pressurization direction is thicker than a thickness of the second part in the pressurization direction, and wherein the second part is closer to the center portion of the elastic portion than the first part in the rotation axial direction.

2. The fixing apparatus according to claim 1, wherein a thickness, in the pressurization direction, of the elastic portion increases gradually from the center portion to both end portions in the rotation axial direction.

3. The fixing apparatus according to claim 1, wherein the support member comprises a contact surface in contact with the elastic portion in the pressurization direction, and wherein a height, in the pressurization direction, of the contact surface is constant across an entire length thereof in the rotation axial direction.

4. The fixing apparatus according to claim 1, wherein the elastic portion is composed of polyimide resin.

5. The fixing apparatus according to claim 1, wherein the elastic portion is composed of resin containing glass balloons.

6. The fixing apparatus according to claim 1, wherein the nip member and the support member are made of metals.

7. An image forming apparatus comprising:

an image forming portion configured to form a toner image onto a sheet; and a fixing apparatus configured to fix the toner image which has been formed by the image forming portion onto the sheet, the fixing apparatus comprising:

a first rotary member which is formed to be endless;

a heating element disposed inside of the first rotary member;

a second rotary member in contact with an outer circumferential surface of the first rotary member and forming a nip portion which fixes a toner image onto a sheet together with the first rotary member;

a nip member provided slidably with an inner circumferential surface of the first rotary member so as to nip the first rotary member together with the second rotary member and configured to heat the nip portion by receiving radiant heat from the heating element;

a support member supporting the nip member; and an elastic portion having elastic modulus lower than that of the support member and the nip member, the elastic portion being disposed between the support member and the nip member in a pressurization direction orthogonal to a rotation axial direction of the second rotary member and to a sheet conveyance direction, wherein the elastic portion comprises first and second parts located at positions different from each other in the rotation axial direction, wherein a thickness of the first part in the pressurization direction is thicker than a thickness of the second part in the pressurization direction, and wherein the second part is closer to the center portion of the elastic portion than the first part in the rotation axial direction.

* * * * *